US011992898B2

(12) United States Patent
Cardon et al.

(10) Patent No.: US 11,992,898 B2
(45) Date of Patent: May 28, 2024

(54) LASER SYSTEM AND METHODS FOR CONTAINING A LASER BEAM AND MANUFACTURING A LASER CONTAINMENT APPARATUS

(71) Applicant: The Boeing Company, Chicago, IL (US)

(72) Inventors: Lisa Cardon, Lake Tapps, WA (US); Matthew Carl Johnson, Auburn, WA (US); Matthew W. Smith, Puyallup, WA (US); Marc James Froning, Seattle, WA (US)

(73) Assignee: The Boeing Company, Arlington, VA (US)

( * ) Notice: Subject to any disclaimer, the term of this patent is extended or adjusted under 35 U.S.C. 154(b) by 342 days.

(21) Appl. No.: 17/305,832

(22) Filed: Jul. 15, 2021

(65) Prior Publication Data

US 2022/0184736 A1   Jun. 16, 2022

Related U.S. Application Data

(60) Provisional application No. 63/123,699, filed on Dec. 10, 2020.

(51) Int. Cl.
*B23K 26/12* (2014.01)
*B23K 26/00* (2014.01)
*B23K 26/70* (2014.01)

(52) U.S. Cl.
CPC .......... *B23K 26/128* (2013.01); *B23K 26/009* (2013.01); *B23K 26/0096* (2013.01);
(Continued)

(58) Field of Classification Search
CPC .. B23K 26/128; B23K 26/705; B23K 26/706; B23K 26/009; B23K 26/0096; B23K 26/123
See application file for complete search history.

(56) References Cited

U.S. PATENT DOCUMENTS

2016/0221121 A1* 8/2016 Gutierrez, Jr. ..... B23K 26/1476
2023/0061659 A1* 3/2023 Oswald ............. B23K 26/0643

FOREIGN PATENT DOCUMENTS

EP           1789227 B1 *  7/2013 ........... B23K 26/032
KR      100370555 B1 *  1/2003 ........... B23K 26/042

OTHER PUBLICATIONS

"Det-Tronics Instructions: Universal Air Shield Assembly Q1116," Detector Electronics Corporation, Available Online at https://www.det-tronics.com/content/documents/95-8597-1.1-(Q1116).pdf, 2020, 4 pages.
(Continued)

*Primary Examiner* — Janie M Loeppke
*Assistant Examiner* — Theodore J Evangelista
(74) *Attorney, Agent, or Firm* — Alleman Hall & Tuttle LLP

(57) ABSTRACT

A laser system includes a controller, a laser source, a laser scanner, and a laser containment apparatus. The laser containment apparatus includes a mounting structure for the laser scanner, a shroud assembly coupled to the mounting structure, and a seal interface coupled to the shroud assembly at an opposite end from the laser scanner. The shroud assembly surrounds a working volume of the laser scanner and includes a vacuum port connected to a vacuum source and a purge port that guides purge gas from a purge gas source toward the laser scanner. A distal end of the seal interface is formed of a pliable material that compresses to seal the shroud assembly to a target surface of a workpiece upon establishment of a negative pressure differential between a vacuum pressure inside the shroud assembly and ambient atmospheric pressure.

20 Claims, 13 Drawing Sheets

(52) U.S. Cl.
CPC .......... B23K 26/123 (2013.01); B23K 26/705 (2015.10); B23K 26/706 (2015.10)

(56) References Cited

OTHER PUBLICATIONS

Standard Air Wipe, Representative Website Available at https://www.exair.com/aw.html, Retrieved on Jul. 14, 2021, 2 pages.
"Hawkeye V3 HD Video Borescopes," Gradient Lens Corporation, Available Online at https://www.gradientlens.com/product/hawkeye-v3-hd-video-borescopes/, Website Available as Early as Sep. 25, 2020, 4 pages.
Weld Fume Control Solutions, Representative Website Available at https://www.lincolnelectric.com/en-us/Equipment/pages/product.aspx?product=Products_WeldFumeControl-PortableFumeControlUnits(LincolnElectric)&producttype=wc&detail=K3972-3(LincolnElectric), Website Available as Early as Nov. 8, 2017, 2 pages.
"MFP 30W Q-Switch Pulsed Fiber Laser," Max Photonics, Available Online at http://en.maxphotonics.com/vancheerfile/files/2021/2/20210201180014786.pdf, 2021, 2 pages.
Klutch 2-Tier Welding Cart with Locking Cabinet—27¼in. L×18¾in. W×35¾in.H, Representative Website Available at https://www.northerntool.com/shop/tools/product_200659134_200659134, Website Available as Early as Feb. 13, 2016, 2 pages.
"Compressed Air and Gas Filters," Parker Balston, Available Online at http://www.balstonfilters.com/products/air-gas-filters, Available as Early as Nov. 15, 2014, 2 pages.
SMC ZSE30A-N7L-F switch, ZSE30 Vacuum Switch, Representative Website Available at https://www.smcpneumatics.com/ZSE30A-N7L-F.html, Retrieved on Jul. 14, 2021, 3 pages.
"Desktop Fiber Laser Marking Machine," Triumph, Available Online at http://www.triumphlaser.com/laser-marking-system/, Available as Early as Jul. 20, 2017, 17 pages.
Vestil Easy-Access Steel Stock Trucks, Representative Website Available at https://www.vestil.com/product.php?FID=928, Retrieved on Jul. 14, 2021, 3 pages.

\* cited by examiner

LASER SYSTEM AND METHODS FOR CONTAINING A LASER BEAM AND MANUFACTURING A LASER CONTAINMENT APPARATUS

CROSS REFERENCE TO RELATED APPLICATIONS

This application claims priority to U.S. Patent Application Ser. No. 63/123,699, filed Dec. 10, 2020, the entirety of which is hereby incorporated herein by reference for all purposes.

FIELD

The present disclosure relates generally to a laser containment system for local containment of a laser beam during a laser application.

BACKGROUND

Laser applications are used in a variety of manufacturing and maintenance processes. In the context of aircraft manufacturing and maintenance, laser applications may be used in place of conventional labor-intensive, ergonomically challenging, and chemical-dependent processes such as removal of surface coatings, preparation for composite bonding or welding, marking or engraving, drilling holes and microperforations, machining, and tool cleaning, for example. When performing a laser application, a user may be subjected to hazardous conditions including laser exposure, airborne contaminants, fires, explosions, and electrocution.

One approach for protecting users during laser applications includes using a laser enclosure in which the laser system and workpieces are contained. Due to design considerations such as material handling, industrial hygiene, fire suppression, utilities, and the like, industrial laser enclosures are typically configured as large, permanent structures.

SUMMARY

According to an example of the present disclosure, a laser containment apparatus is provided. The laser containment apparatus includes a mounting structure configured to secure a laser scanner, a shroud assembly coupled to the mounting structure, and a seal interface coupled to the shroud assembly at an opposite end of the shroud assembly from the laser scanner. The laser scanner includes a laser source. The shroud assembly surrounds a working volume of the laser scanner and includes a vacuum port configured to connect to a vacuum source and a purge gas from a purge gas source toward the laser scanner. A distal end of the seal interface is formed of a pliable material.

According to another example of the present disclosure, a method for containing a laser beam is provided. The method includes securing a laser scanner to a mounting structure, coupling a shroud assembly to the mounting structure, the shroud assembly being configured to surround a working volume of the laser scanner, coupling a seal interface to the shroud assembly at an opposite end of the shroud assembly from the laser scanner, connecting a vacuum source to a vacuum port included in the shroud assembly, connecting a purge gas source to a purge port included in the shroud assembly, positioning the shroud assembly on a target surface of a workpiece, and establishing a negative pressure differential between a vacuum pressure inside the shroud assembly and ambient atmospheric pressure during operation of the laser scanner to seal the shroud assembly to the target surface of the workpiece.

According to another example of the present disclosure, a laser containment system is provided. The laser containment system includes a controller, a laser scanner including a laser source, and a laser containment apparatus. The laser containment apparatus includes a mounting structure configured to secure a laser scanner, a shroud assembly couple to the mounting structure, and a seal interface coupled to the shroud assembly at an opposite end of the shroud assembly from the laser scanner. The shroud assembly surrounds a working volume of the laser scanner and includes a vacuum port configured to connect to a vacuum source and a purge port configured to guide purge gas from a purge gas source toward the laser scanner. A distal end of the seal interface is formed of a pliable material that is configured to compress and seal the shroud assembly to a target surface of a workpiece upon establishment of a negative pressure differential between a vacuum pressure inside the shroud assembly and ambient atmospheric pressure. The controller is configured to control the laser source in accordance with feedback from one or more sensors.

According to another example of the present disclosure, a method for manufacturing a laser containment apparatus is provided. The method includes forming a mounting structure to secure a laser scanner, including a laser source in the laser scanner, forming a vacuum adapter to couple with the mounting structure, forming an outer shroud and an inner shroud to couple to the vacuum adapter to create a shroud assembly that surrounds a working volume of the laser scanner, shaping the outer shroud and the inner shroud such that a passage is formed therebetween upon coupling to the vacuum adapter, forming, in the vacuum adapter, a vacuum port configured to connect to a vacuum source and a purge port configured to guide purge gas from a purge gas source toward the laser scanner, forming the vacuum port to fluidically communicate with the passage, shaping a seal interface to couple with the shroud assembly at an opposite end of the shroud assembly from the laser scanner, and forming a distal end of the seal interface of a pliable material that is configured to compress and seal the shroud assembly to a target surface of a workpiece upon establishment of a negative pressure differential between a vacuum pressure inside the shroud assembly and ambient atmospheric pressure.

DETAILED DESCRIPTION

A laser system and methods for use and manufacture are disclosed herein. The laser system can be used, for example, to enclose a laser beam and remove effluent during operation of a laser scanner. The laser system and methods have the potential to provide a laser-safe environment for performing localized laser applications. More specifically, the present disclosure describes using a portable laser scanner coupled to a laser containment apparatus that is vacuum-sealed to a workpiece during operation to contain the laser beam and effluent. A controller is configured to interrupt power to the laser source when the seal to the workpiece is compromised, such as a decrease in vacuum pressure and/or light leakage in the shroud assembly. This local containment of the laser beam and removal of effluent can enable the user to safely perform laser applications at the location of the workpiece, which can improve cost and efficiency for manufacturing and maintenance processes that may be performed using laser applications.

Figure 1:
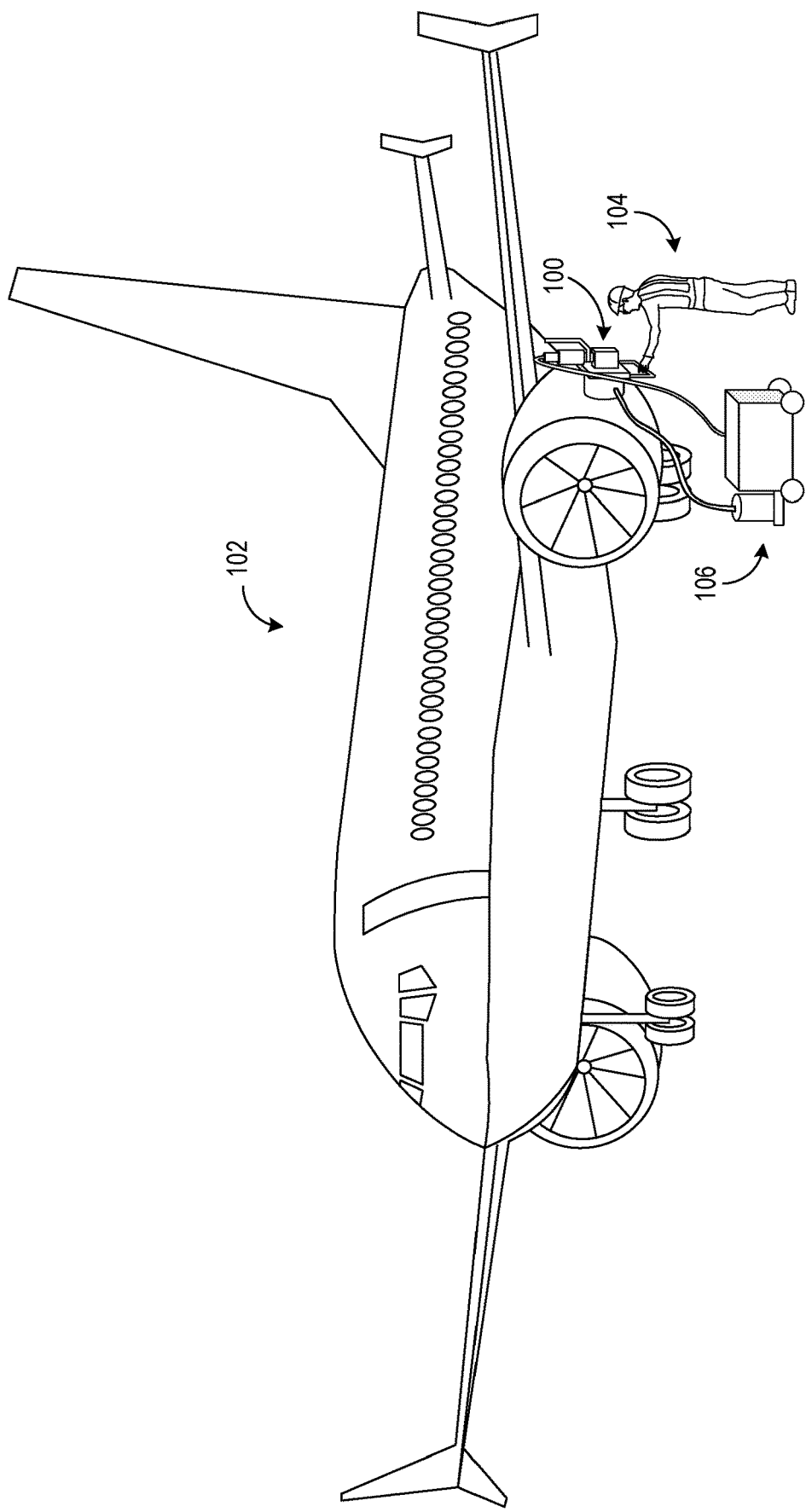
FIG. 1 shows a laser containment apparatus, according to one example configuration, used in a laser application at the location of a workpiece.

FIG. 1 shows an example use-case scenario in which a laser containment apparatus 100 is used for a laser application at the location of a workpiece on an aircraft 102. The aircraft 102 takes the form a commercial passenger aircraft in this example. However, the aircraft 102 can take other suitable forms or include a different type of large-scale object (e.g., a vehicle or marine vessel). The laser containment apparatus 100 can be used in applications such as laser marking, laser engraving, laser tool cleaning, laser hole drilling, laser micro-perforation, laser removal of adhesive, laser removal of sealant, laser removal of coating, laser preparation for composite bonding, laser preparation for welding, remote laser welding, laser machining of composites, and laser-assisted metal additive repair, for example. In the example of FIG. 1, a user 104 is shown performing the laser application with the laser containment apparatus 100 included in a laser system 106. It will be appreciated that the aircraft 102 and the user 104 are provided for illustrative purposes and are thus not to scale with respect to one another. The laser system 106 described herein has the potential to reduce technical, operational, regulatory, and economic barriers of performing laser applications with a class III+ laser system without sacrificing protection of the user or bystanders from typical risks associated with laser use.

Figure 2:
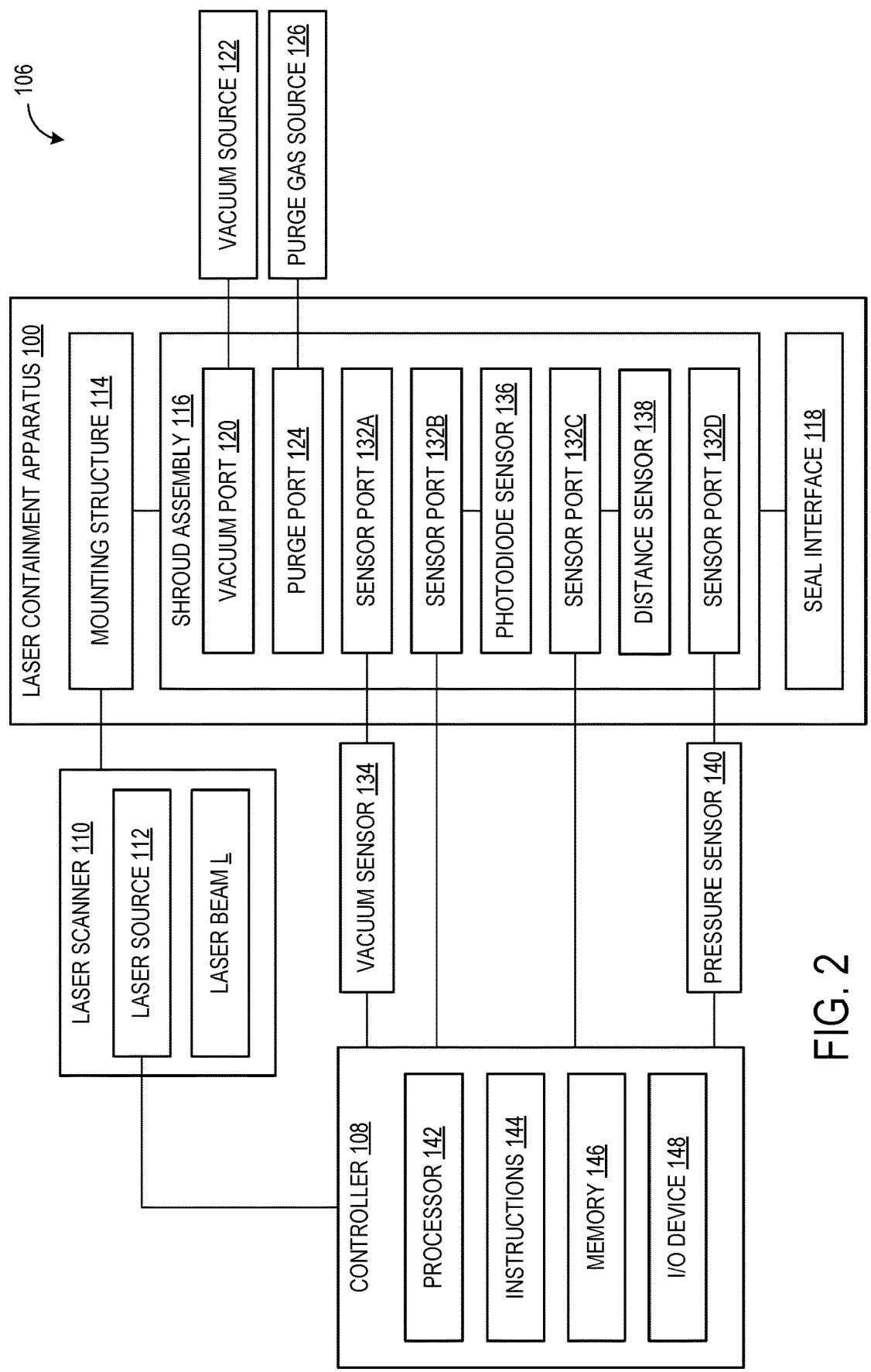
FIG. 2 shows a schematic diagram of components that can be included in a laser system with the laser containment apparatus of FIG. 1.

A schematic diagram of components that can be included in the laser system 106 is shown in FIG. 2. The laser system 106 includes a controller 108, a laser scanner 110 with a laser source 112, and the laser containment apparatus 100. The laser containment apparatus 100 includes a mounting structure 114 configured to secure the laser scanner 110, a shroud assembly 116 coupled to the mounting structure 114, and a seal interface 118 coupled to the shroud assembly 116 at an opposite end of the shroud assembly 116 from the laser scanner 110. As described in detail below, the shroud assembly 116 is laser-safe enclosure configured to surround a working volume V (shown in FIGS. 4 and 5) of the laser scanner 110.

The laser scanner 110 can be configured as a handheld fiber laser marking machine, for example. However, it will be appreciated that the laser scanner 110 can take the form of any other laser transmitter suitable for laser applications.

The shroud assembly 116 includes a vacuum port 120 configured to connect to a vacuum source 122. The vacuum source 122 can be a portable industrial vacuum such as a fume extractor, for example, that generates an atmospheric vacuum inside the shroud assembly and removes contaminants such as fumes and effluent from the laser containment apparatus 100.

The shroud assembly 116 further includes a purge port 124, which is configured to guide purge gas G (shown in FIG. 7) from a purge gas source 126 toward the laser scanner 110. The purge gas G can be compressed air or nitrogen ($N_2$) or any mix of gasses necessary to establish the atmospheric conditions for the laser process. As described in detail below with reference to FIG. 7, the purge gas G is directed from the purge port 124 toward the laser scanner 110 to clear optics of the laser scanner 110, and then flows downward through the shroud assembly 116 to blow the plasma plume and effluent away from a target surface 128 of a workpiece 130.

The vacuum source 122 extracts the purge gas G and contaminants from the laser containment apparatus 100 at a higher flow rate than a flow rate at which the purge gas G is supplied to the laser containment apparatus 100 by the purge gas source 126, thereby forming a vacuum within the shroud assembly 116. As such, a negative pressure differential between a vacuum pressure inside the shroud assembly 116 and ambient atmospheric pressure is established during operation of the laser scanner 110, thereby sealing the laser containment apparatus 100 to the target surface 128 of the workpiece 130.

The shroud assembly 116 further includes at least one sensor port 132. The sensor port 132 provides an interface between the shroud assembly 116 and a sensor that monitors one or more functions of the laser scanner 110 or the shroud assembly 116. In the example embodiment described herein, the laser system 106 includes a vacuum sensor 134, a photodiode sensor 136, a distance sensor 138, and a pressure sensor 140.

The vacuum sensor 134 is in fluidic communication with a sensor port 132A and monitors a value of the negative pressure differential during operation of the laser scanner 110 when the shroud assembly 116 is sealed to the target surface 128 of the workpiece 130. The photodiode sensor 136 is in electric communication with a sensor port 132B and monitors a value of a light intensity or wavelength inside the shroud assembly 116 prior to operation of the laser scanner 110. The distance sensor 138 monitors a value of a transmission distance of a laser beam L via a sensor port 132C. The pressure sensor 140 is in fluidic communication with a sensor port 132 C and monitors a value of a gas pressure supplied by the purge gas source 126.

The controller 108 is configured to control the laser source 112 of the laser containment apparatus 100 according to feedback from the sensors 134, 136, 138, 140. Specifically, the controller 108 interrupts power to the laser source 112 when the vacuum sensor 134 detects that the monitored value of the negative pressure differential falls below a threshold operating value to prevent operation of the laser scanner 110 when the seal between the laser containment apparatus 100 and the workpiece 130 is not air-tight and may expose the user to potentially harmful laser toxins, and/or gaseous effluent. For clarity, it will be appreciated that negative pressure differential (i.e., vacuum) relative to atmosphere increases as the pressure drops. Thus, the monitored value of the negative pressure differential relative to atmosphere falls below a threshold operating value when the absolute pressure rises above the threshold operating value. When the photodiode sensor 136 detects that the monitored value of the light intensity or the wavelength exceeds a threshold operating value, the controller 108 is configured to disable the laser source 112, which indicates that the seal between the laser containment apparatus 100 and the workpiece 130 is not light-tight. The controller 108 interrupts power to the laser source 112 when the distance sensor 138 detects that the monitored value of the transmission distance exceeds a threshold operating value to prevent the laser beam L from irradiating above or below the target surface 128 of the workpiece 130. When the pressure sensor 140 detects that the monitored value of a gas pressure supplied by the purge gas source 126 does not meet a threshold operating value, the controller 108 is configured to interrupt power to the laser source 112 such that laser emissions are not permitted when the gas pressure of the purge gas G is not sufficient for clearing the optics and/or blowing effluent away from the workpiece 130.

Accordingly, as shown in FIG. 2, the controller 108 can be configured as a programmable logic controller (PLC), for example, and includes at least one processor 142 that executes instructions 144 (e.g., programs) stored in memory 146 to perform one or more operations, such as controlling the laser source 112. The controller 108 further includes one or more input/output (I/O) devices 148 by which the processor 142 can communicate or interact with other components of the laser system such as the sensors 134, 136, 138 and laser source 112. In at least some examples, a combination of the processor 142, the memory 146 including instructions 144 stored thereon, and the I/O devices 148 take the form of one or more computing devices. The I/O devices 148 can be configured as integrated I/O devices and/or peripheral I/O devices such as a smart phone or a remote computer, for example. The I/O devices 148 can accept input to the controller 108 from users, another device, and/or sensors, such as sensors 134, 136, 138, 140, and output information to users, another device, a controlled component of the laser containment apparatus 100, and/or a component of the laser system 106.

Figure 3:
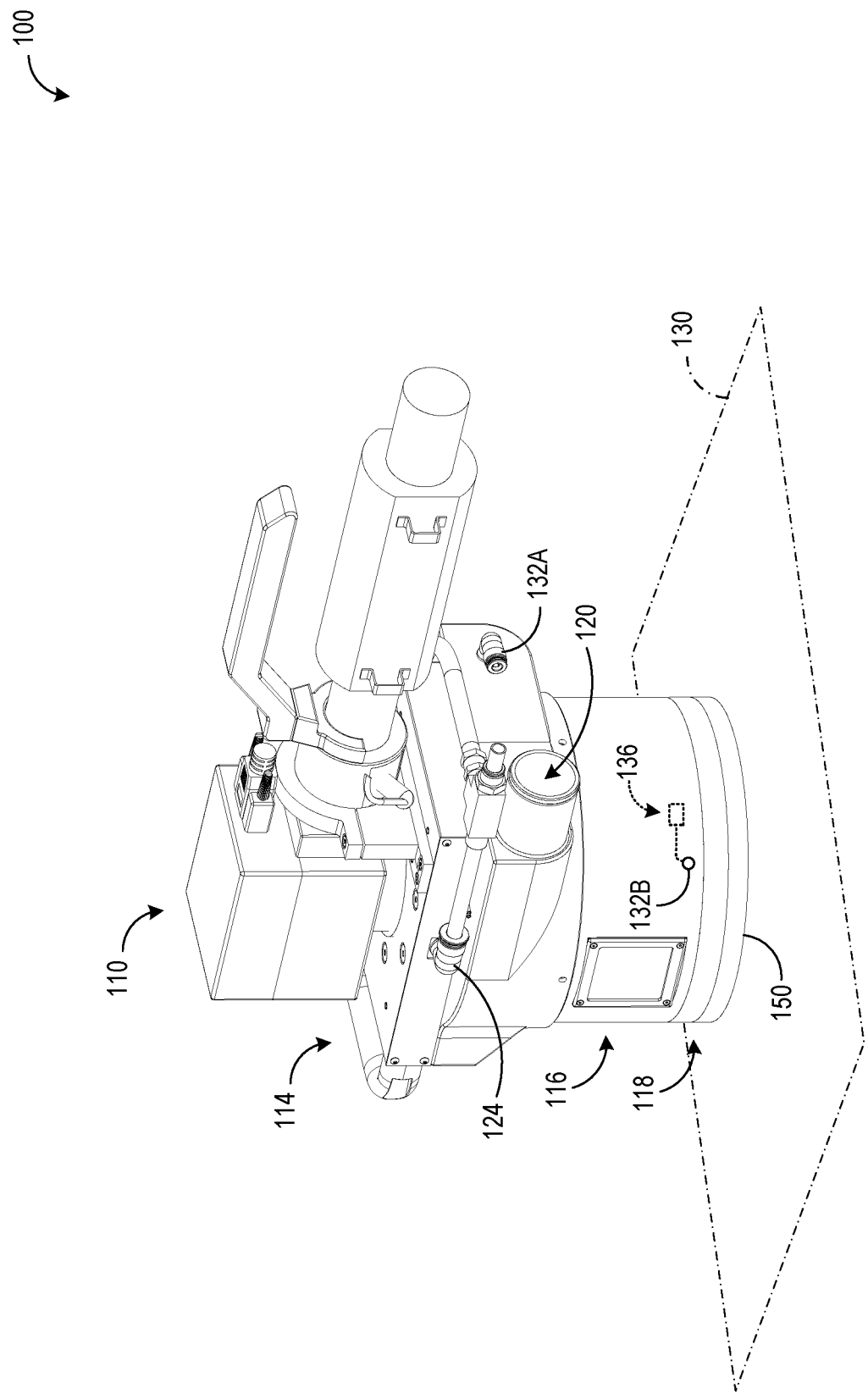
FIG. 3 shows a perspective view of the laser containment apparatus of FIG. 1.

FIG. 3 shows a perspective view of the laser containment apparatus 100 positioned on the workpiece 130 (shown in dash dot line). As described above with reference to FIG. 2, the laser containment apparatus 100 includes the mounting structure 114 for the laser scanner 110, the shroud assembly 116, and the seal interface 118. A distal end of the seal interface 118 is formed of a pliable material 150 that is non-flammable, non-marring, non-outgassing, light-tight, air-tight, and durable. During operation of the laser scanner 110, the pliable material 150 of the seal interface 118 is configured to compress and seal the shroud assembly 116 to a target surface of the workpiece 130 due to the negative pressure differential between the vacuum pressure inside the shroud assembly and ambient atmospheric pressure.

As described above, the shroud assembly 116 includes the vacuum port 120, the purge port 124, and at least one sensor port 132. The vacuum port is configured to connect to a vacuum source 122, the purge port 124 is configured to guide purge gas G (shown in FIG. 7) from a purge gas source 126 toward the laser scanner 110. In the embodiment illustrated in FIG. 3, the shroud assembly includes the sensor port 132A and the sensor port 132B.

The sensor port 132A is in fluidic communication with the vacuum sensor 134, which monitors a value of the negative pressure differential during operation of the laser scanner 110 when the shroud assembly 116 is sealed to the target surface 128 of the workpiece 130.

The sensor port 132B is in electric communication with the photodiode sensor 136, which is arranged in the shroud assembly 116, as indicated by in dashed line in FIG. 3. The photodiode sensor monitors a value of the light intensity or the wavelength inside the shroud assembly 116.

Figure 5:
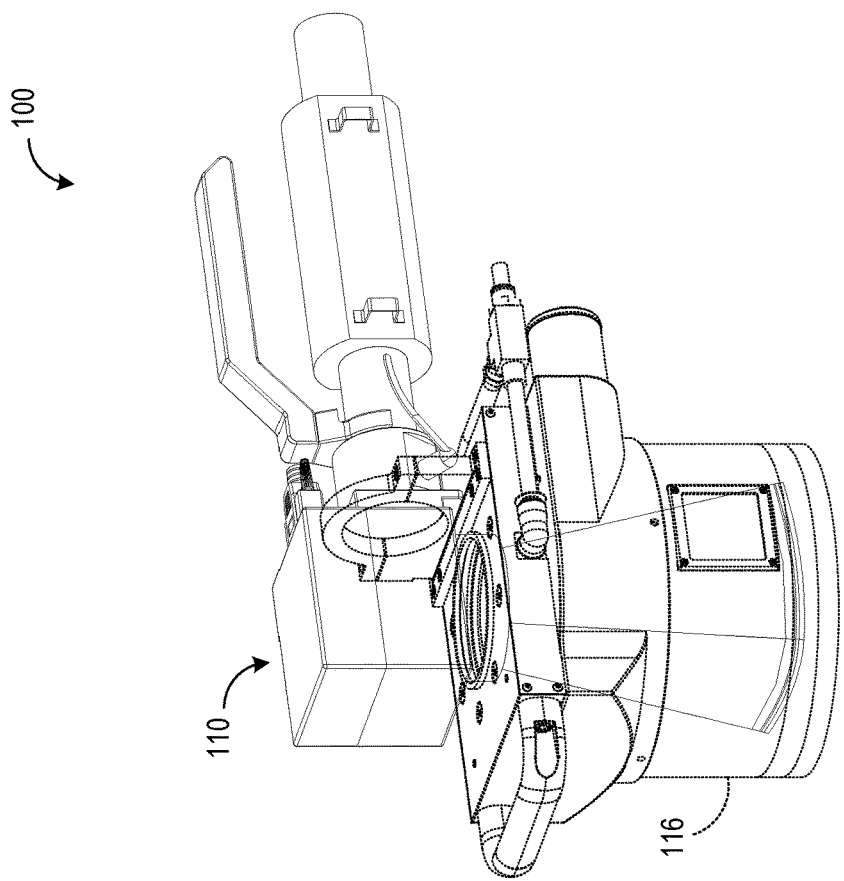
FIG. 5 shows the working volume of the laser containment apparatus in relation to the shroud assembly of the laser containment apparatus of FIG. 1.
Figure 4:
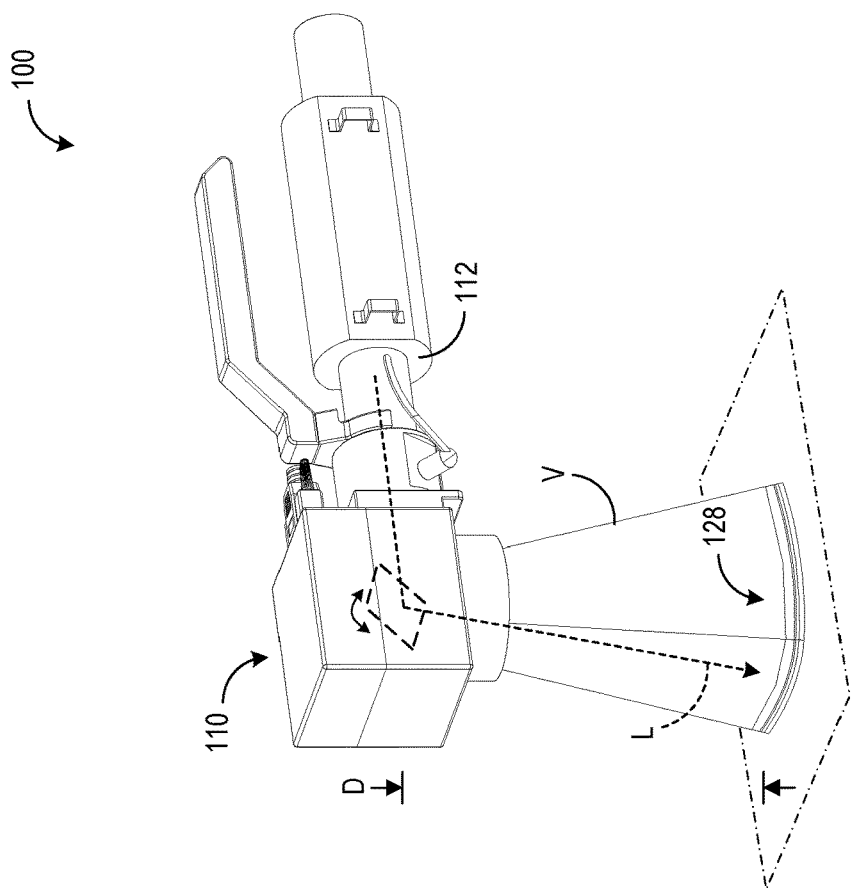
FIG. 4 shows the working volume of the laser containment apparatus of FIG. 1.

FIGS. 4 and 5 show the working volume V of the laser scanner 110, which is a three-dimensional area defined by a transmission range of the laser beam L emitted by the laser source 112. In FIG. 4, the working volume V is illustrated in relation to the laser scanner 110 and includes the target surface 128. As described above with reference to FIG. 2, the transmission distance of the laser beam L is monitored by the distance sensor 138. The transmission distance D of the laser beam L to the target surface 128 of the workpiece 130 (shown in dash dot line) is indicated in FIG. 4.

In addition to the distance sensor 138, the laser containment apparatus 100 can include a visual alignment system, such as a video borescope, a power-over-ethernet (PoE) camera, or the like to assist the user in accurately positioning the laser containment apparatus 100 on the target surface 128 of the workpiece 130. Light-emitting diodes (LEDs) or other illumination sources can be included inside the shroud assembly 116 to further assist with visual positioning of the laser containment apparatus 100. As described above and shown in FIG. 5, the shroud assembly 116 (shown in dashed line) surrounds the working volume V of the laser scanner 110.

Figure 6:
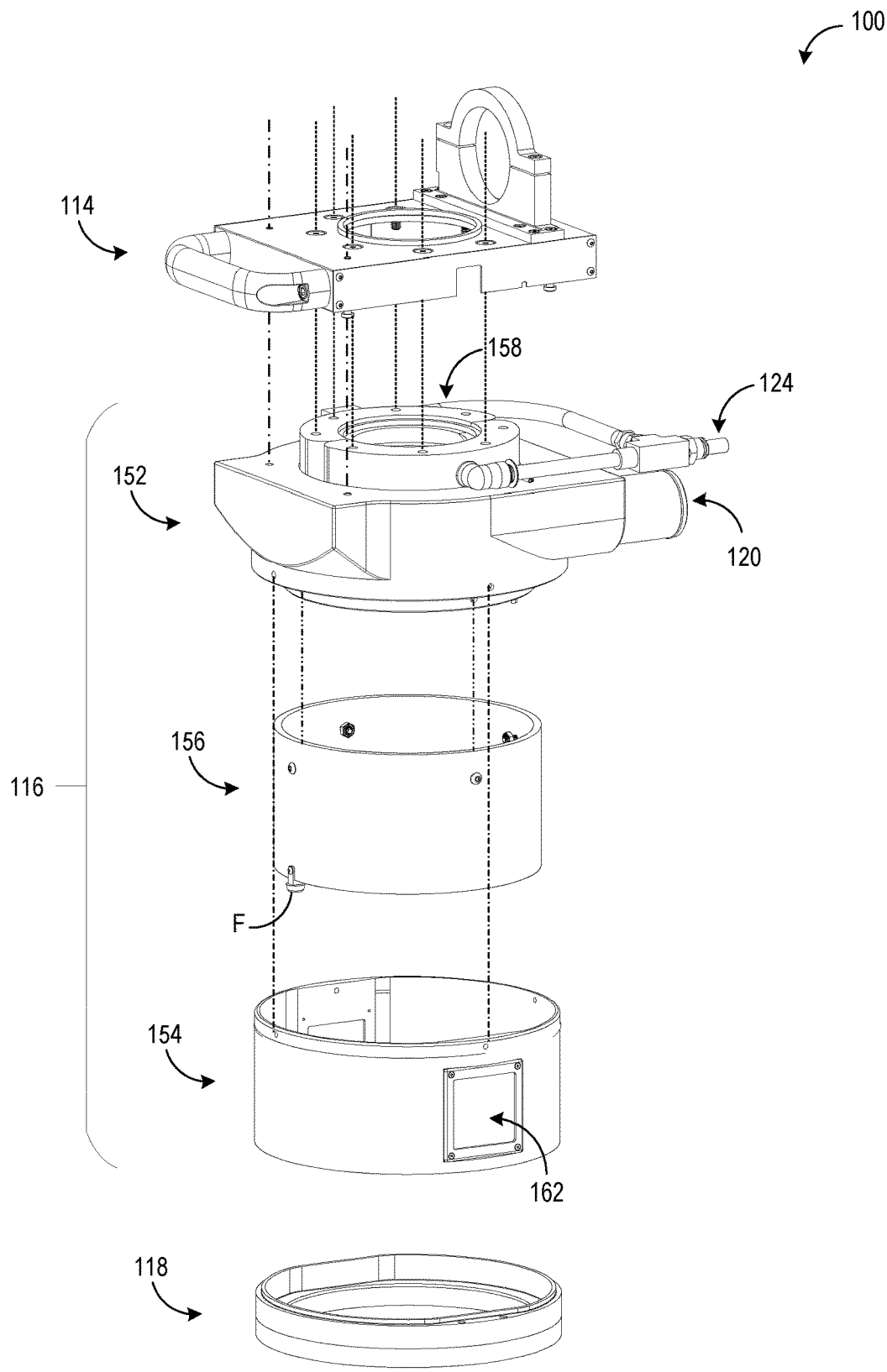
FIG. 6 shows an exploded view of the laser containment apparatus of FIG. 1.

An exploded view of the components of the laser containment apparatus 100 is illustrated in FIG. 6 As described above, the laser containment apparatus 100 includes the mounting structure 114, the shroud assembly 116, and the seal interface 118. The mounting structure 114 is configured to secure the laser scanner 110, and the shroud assembly 116 includes a vacuum adapter 152, an outer shroud 154, and an inner shroud 156.

The vacuum adapter 152 is coupled to the mounting structure 114, as indicated by the dash dot lines, and includes the vacuum port 120 and at least one sensor port 132. The vacuum adapter can further include an air wipe 158, such as an air knife, for example. As indicated by the dashed lines in FIG. 6, the air wipe 158 can be coupled to the mounting structure 114.

As described above, the purge port 124 is configured to guide the purge gas G from the purge gas source 126 to the laser containment apparatus 100. To deliver the purge gas G to the shroud assembly 116 of the laser containment apparatus 100, the purge port 124 connects to the air wipe 158. The air wipe 158 directs a 360 degree flow of purge gas G towards the optics of the laser scanner 110 to continuously clear the optics of the laser scanner 110 during operation. The outer and inner shrouds 154, 156 are coupled to the vacuum adapter 152 at an end of the vacuum adapter 152 opposite the mounting structure 114, as indicated by the dash dash dot and dash dot dot lines, respectively.

The outer shroud 154 can be formed of a corrosion- and wear-resistant metallic material, such as black anodized aluminum, for example, and is configured to contain the laser beam L. The outer shroud 154 can include a laser-safe viewing window 162. The outer shroud 154 fits around the inner shroud 156, forming a passage 160 therebetween, as described below with reference to FIG. 7. In the embodiment described herein, the passage 160 is a toroidal passage 160A that fluidically communicates with the vacuum port 120. The inner shroud 156 can be formed of acrylic and is configured to direct the purge gas G from the air wipe 158 to the target surface 128 of the workpiece 130.

As described above, the seal interface 118 is coupled to the shroud assembly 116 at an opposite end of the shroud assembly 116 from the laser scanner 110. In some implementations, the seal interface 118 is coupled to the outer shroud 154 via magnets. However, it will be appreciated that the coupling between the seal interface 118 and the outer shroud 154 can be achieved through another suitable mechanism, such as a threaded interface or mechanical fastener, for example. As described in detail below with reference to FIG. 9, the seal interface 118 can include an indexed shelf for a stencil template.

Figure 7:
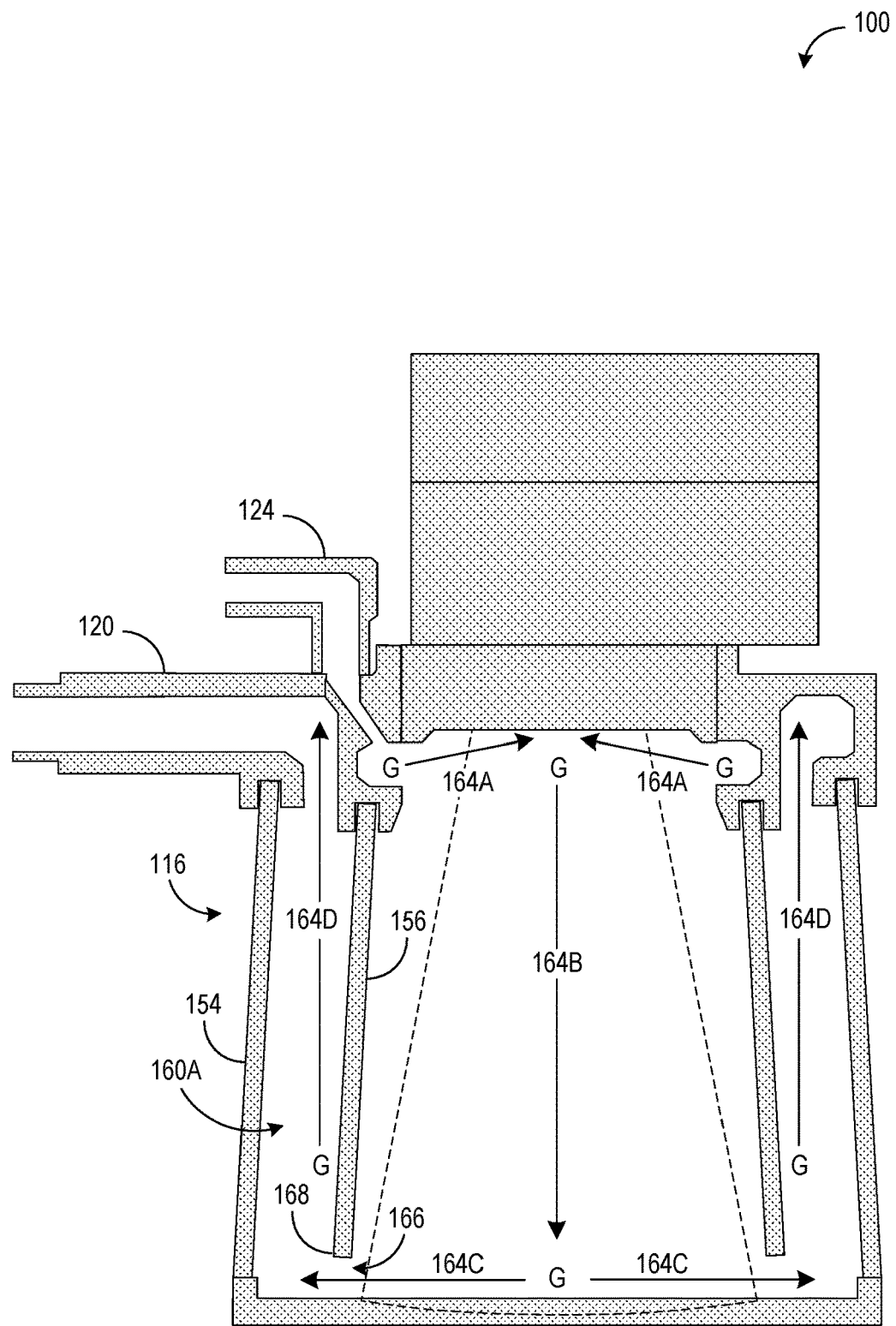
FIG. 7 shows a purge gas flowpath within the shroud assembly of the laser containment apparatus of FIG. 1.

FIG. 7 shows a schematic section view of the laser containment apparatus 100 with a purge gas flowpath 164 defined within the shroud assembly 116. When the purge gas G enters the laser containment apparatus 100, the purge gas flowpath 164 flows the purge gas G toward the laser scanner 110 along a first flowpath segment 164A. As described above, the purge gas G is directed at the laser scanner 110 in 360 degrees to continuously clear the optics of the laser scanner 110 during operation.

The purge gas G subsequently flows downward through the inner shroud 156 toward the workpiece 130 along a second flowpath segment 164B. The downward flow of the purge gas G is configured to have a flow rate sufficient to blow contaminants such as fumes, plasma plume, and effluent away from the target surface 128 of the workpiece 130, thereby cleaning the workpiece 130 and facilitating the laser application by eliminating airborne obscurants in the laser path.

The inner shroud 156 is formed to have a height that is less than that of the outer shroud 154 such that a circumferential gap 166 is formed between the inner shroud 156 and the workpiece 130 at a position adjacent a distal end 168 of the inner shroud 156. An area inside of the inner shroud 156, including the working volume V, fluidically communicates with the toroidal passage 160A. This configuration enables the purge gas G to flow through the circumferential gap 166 and into the toroidal passage 160A along a third flowpath segment 164C.

Lastly, the purge gas G flows up the toroidal passage 160A along a fourth flowpath segment 164D. At the end of the flowpath 164, the purge gas G, carrying contaminants such as fumes and effluent, is extracted from the laser containment apparatus 100 via the vacuum port 120.

Figure 8:
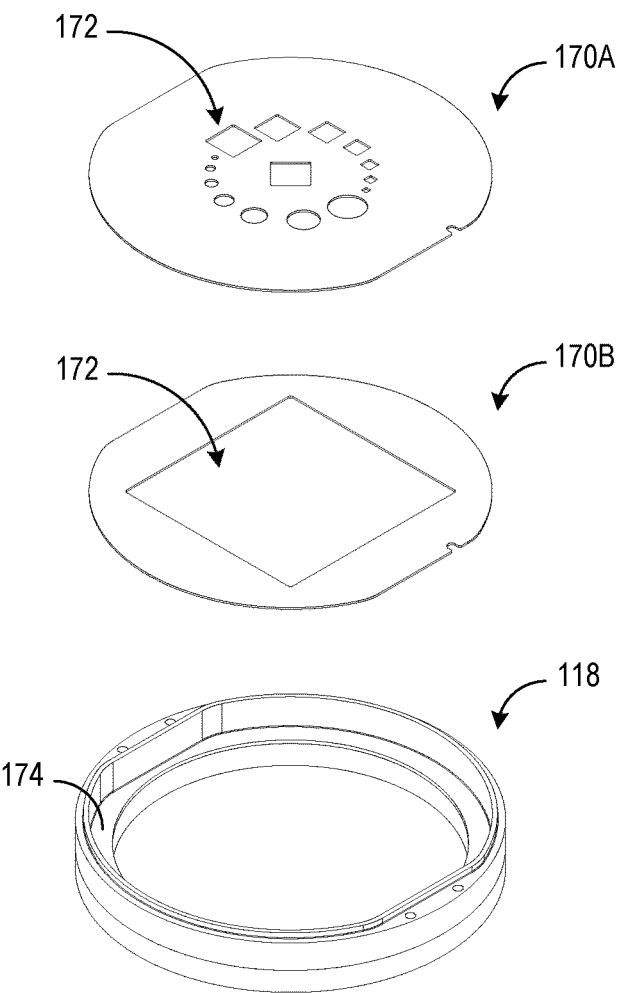
FIG. 8 shows an exploded view of stencil templates and the seal interface of the laser containment apparatus of FIG. 1.

In some implementations, it may be desirable to mask a portion of the target surface 128 of the workpiece 130. Accordingly, the laser containment apparatus 100 can include a stencil template 170 formed to have one or more openings 172 through which the laser beam L is transmitted to the target surface 128 of the workpiece 130. Areas of the target surface 128 that are shielded by the stencil template 170 are not exposed to the laser beam and are thus not processed with the laser application. FIG. 8 shows two examples (170A, 170B) of the stencil template 170. As illustrated, the one or more openings 172 can be formed in a standardized pattern and/or shape.

Figure 9:
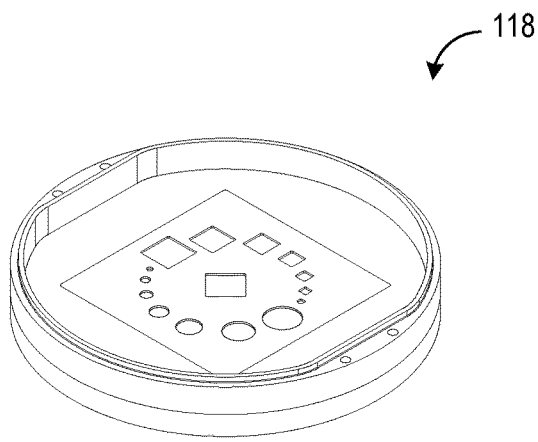
FIG. 9. shows an assembled view of stencil templates and the seal interface of the laser containment apparatus of FIG. 1.

Additionally or alternatively, a shape and/or position of the one or more openings 172 can be customized to suit the needs of a specific laser application. As such, using the stencil template 170 can eliminate the need for programming the laser scanner 110 and simplify the positioning of the laser containment apparatus 100 on the target surface 128. The stencil template 170 is configured to couple to the seal interface 118 via an indexed shelf 174 formed in the seal interface 118. Additionally, with reference to FIG. 6, when the inner shroud 156 is coupled to the seal interface 118, the one or more feet F attached to the distal end 168 of the inner shroud 156 secure the stencil template 170 in a fixed position and prevent it from interfering with the seal interface 118 or becoming misaligned if the laser containment apparatus 110 is positioned in a manner such that gravity could cause the stencil template 170 to move away from the indexed shelf 174. In some implementations, two or more stencil templates 170 may be stacked. Accordingly, FIG. 9 shows the seal interface 118 with the stencil templates 170A and 170B stacked and coupled thereto via the indexed shelf 174 in an assembled form.

Figure 10:
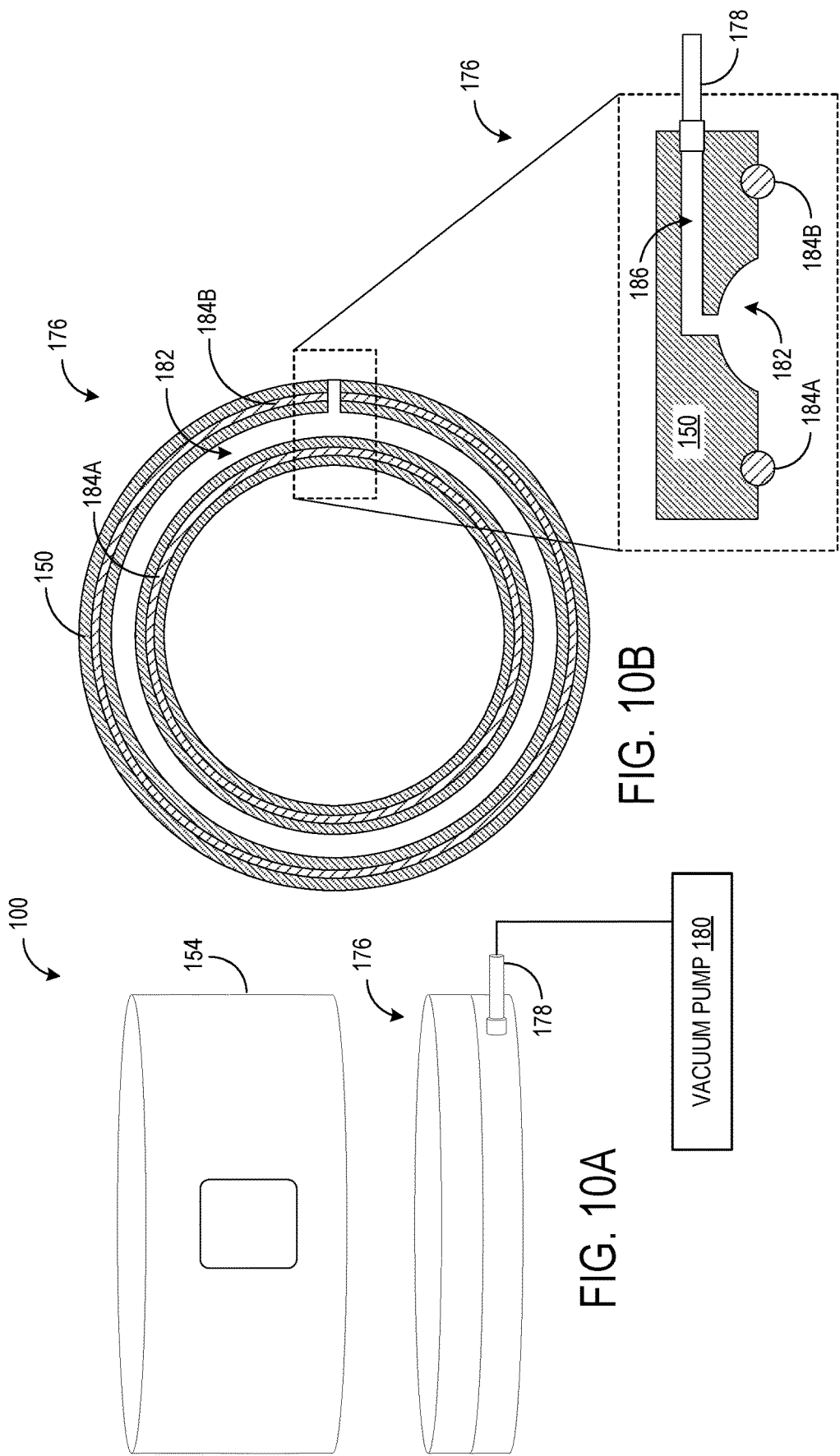
FIGS. 10A and 10B show the seal interface of the laser containment apparatus of FIG. 1 configured as a vacuum chuck.

To assist the user in accurately positioning the laser containment apparatus 100 on the workpiece 130, it may be desirable to secure the seal interface 118 to the workpiece 130 prior to coupling with the shroud assembly 116. To this end, the seal interface 118 can be configured as a vacuum chuck 176, as shown in FIGS. 10A and 10B. A schematic front view of the outer shroud 154 and the seal interface 118 are provided in FIG. 10A. As shown, when configured as the vacuum chuck 176, the seal interface 118 can include a vacuum pump port 178 that connects to a vacuum pump 180.

FIG. 10B shows a schematic top section view of the seal interface 118 configured as the vacuum chuck 176. A vacuum channel 182 runs through a center of the pliable material 150 of the seal interface 118, shown in small crosshatch. O-rings 184A, 184B, shown in large crosshatch, are positioned on either side of the vacuum channel 182 and configured to contact the workpiece 130 when the seal interface 118 is positioned on the workpiece 130.

An enlarged view of a portion of FIG. 10B (indicated in dashed line) shows a schematic side section view of the seal interface 118 configured as the vacuum chuck 176. The vacuum channel 182 fluidically communicates with the vacuum pump port 178 via an outlet 186. When the vacuum pump port 178 is connected to the vacuum pump 180, a vacuum (e.g., negative pressure) is created in the vacuum channel 182. The vacuum pressure compresses the pliable material 150 and the O-rings 184A, 184B to secure the vacuum chuck 176 to the workpiece 130. Once the vacuum chuck 176 is secured to the workpiece 130 at the desired location, the shroud assembly 116 is coupled to the vacuum chuck 176 via magnets or another suitable coupling mechanism. With the seal interface 118 configured as the vacuum chuck 176, the user can visualize a surface of the workpiece 130 that will be within the working volume V of the laser scanner 110 prior to coupling the seal interface 118 with the shroud assembly 116, thereby enabling the user to position the laser containment apparatus 100 with a high level of accuracy.

Figure 11:
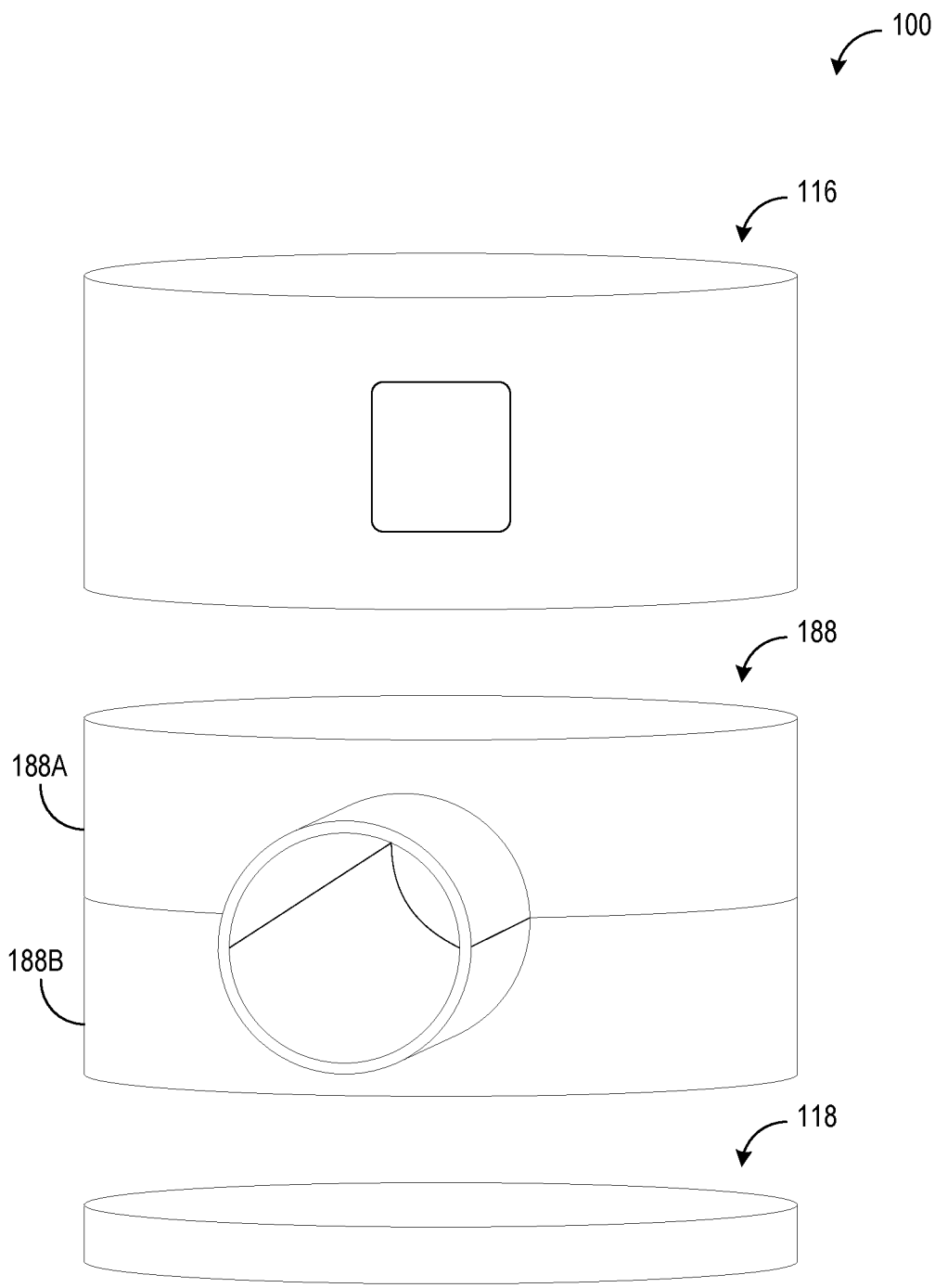
FIG. 11 shows an example adapter of the laser containment apparatus of FIG. 1.

When the workpiece 130 is formed in a shape that is challenging to enclose within the laser containment apparatus 100, the laser containment apparatus can include an adapter 188 to conform to the shape of the workpiece 130. FIG. 11 shows an example of an adapter 188 arranged between the shroud assembly 116 and the seal interface 118. The adapter 188 can include an upper adapter section 188A and a lower adapter section 188B that are configured to be coupled around the workpiece 130 such that a light-tight seal is formed around the workpiece 130 when the target surface 128 of the workpiece 130 is positioned within the working volume V of the laser scanner 110. In the example shown in FIG. 11, the adapter 188 is configured to conform to a workpiece 130 with a round shape such as a duct section, for example. However, it will be appreciated that the adapter 188 can readily be custom-made to fit a shape of the workpiece 130 via processes such as fabrication, three-dimensional printing, or the like, thereby enabling the user to implement the laser containment apparatus 100 with a broad range of differently shaped workpieces.

In some implementations, the laser system 106 is configured as a mobile unit that can be placed on a cart and moved to the workpiece 130. This configuration is suitable for performing laser applications on small target surfaces and/or for on-location work in manufacturing facilities and/or airfields.

Figure 12:
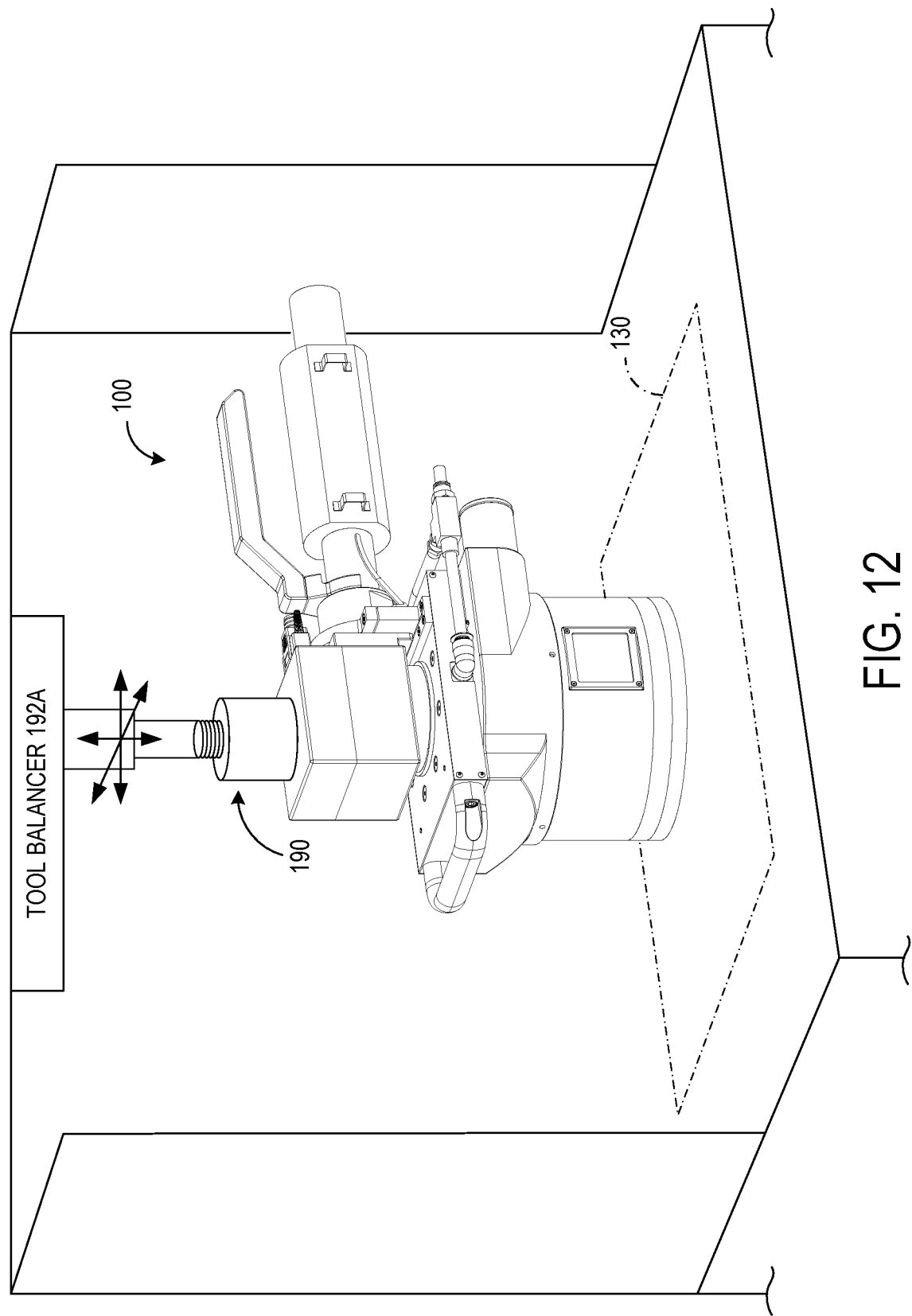
FIG. 12 shows the laser containment apparatus of FIG. 1 with a mounting adapter.

In other implementations, it may be desirable for the laser system 106 to be removably fixed to a support structure. To this end, the laser containment apparatus 100 can include a mounting adapter 190, as shown in FIG. 12. The mounting adapter 190 is configured to mount the laser containment apparatus 100 to a support structure 192, such as a movable tool mount, a robotic device, a flex-track, or a gantry-mounted positioner, for example. FIG. 12 schematically shows an example support structure 192 configured as a zero degree tool balancer 192A installed over a workbench, which enables the user to position the laser containment apparatus 100 with 6 degrees of freedom (DoF) to accommodate different orientations of the workpiece 130. However, it will be appreciated that the support structure 192 may be configured as any number of suitable devices. This configuration enables the laser containment apparatus 100 to be used with larger parts, on elevated assemblies, and/or for laser applications that require consistent patterns.

Figure 13:
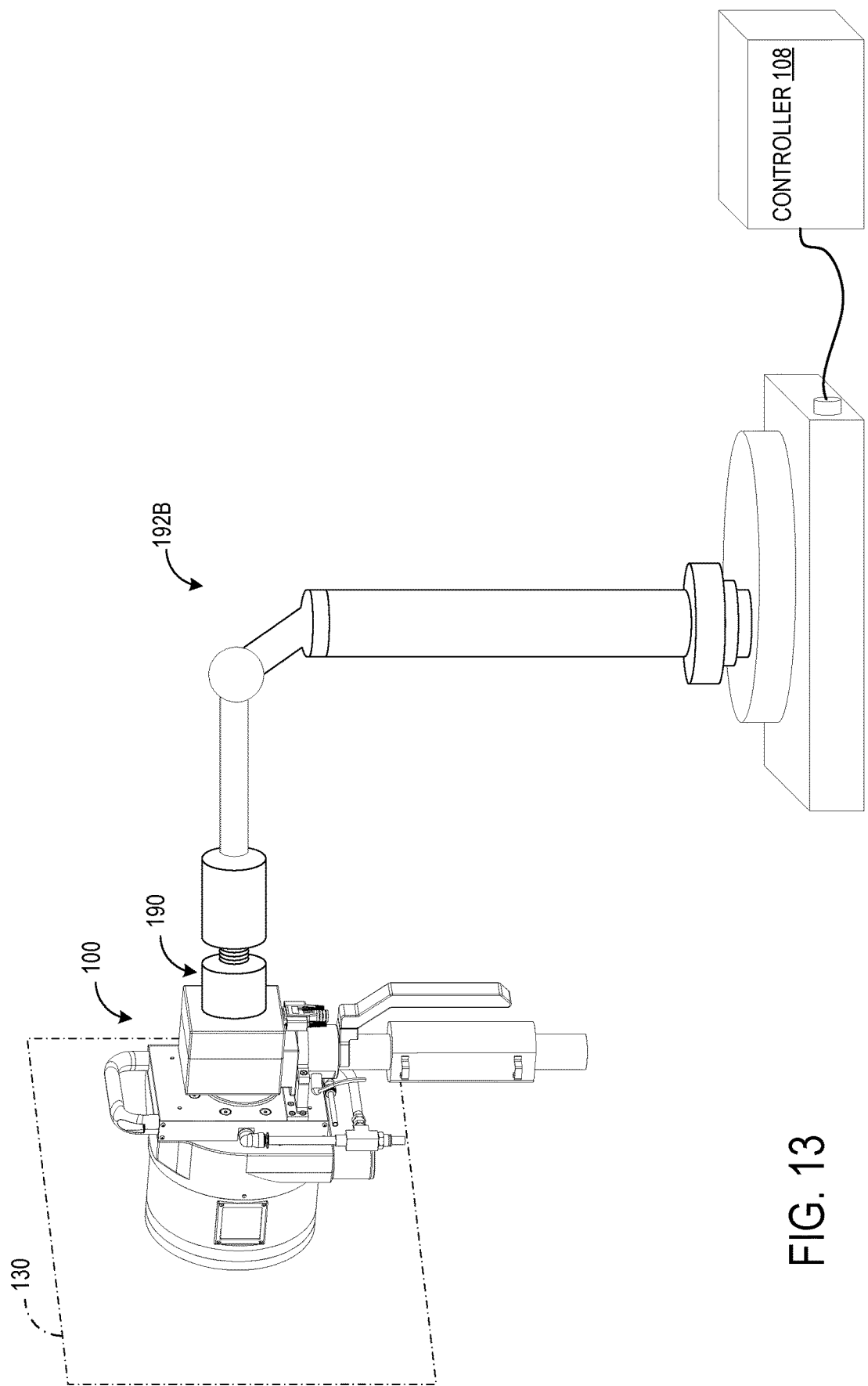
FIG. 13 shows a laser system in which the laser containment apparatus of FIG. 1 is mounted on a robotic device.

Another example support structure 192 configured as a robotic device 192B is illustrated in FIG. 13. The robotic device 192B can be configured as a stationary automated unit. Alternatively, the robotic device 192B can be secured to a mobile chassis. When the laser containment apparatus 100 is mounted on the robotic device 192B, the controller 108 is configured to control the robotic device 192B in accordance with feedback from the one or more sensors 134, 136, 138, 140. For example, when the monitored value of the negative pressure differential falls below a threshold operating value, the monitored value of the light intensity or the wavelength exceeds a threshold operating value, the monitored value of the transmission distance of the laser beam L exceeds a threshold operating value, and/or the monitored value of a gas pressure supplied by the purge gas source 126 does not meet a threshold operating value, the controller 108 can be configured to disable motion of the robotic device 192B, in addition to disabling the laser source 112.

Figure 14:
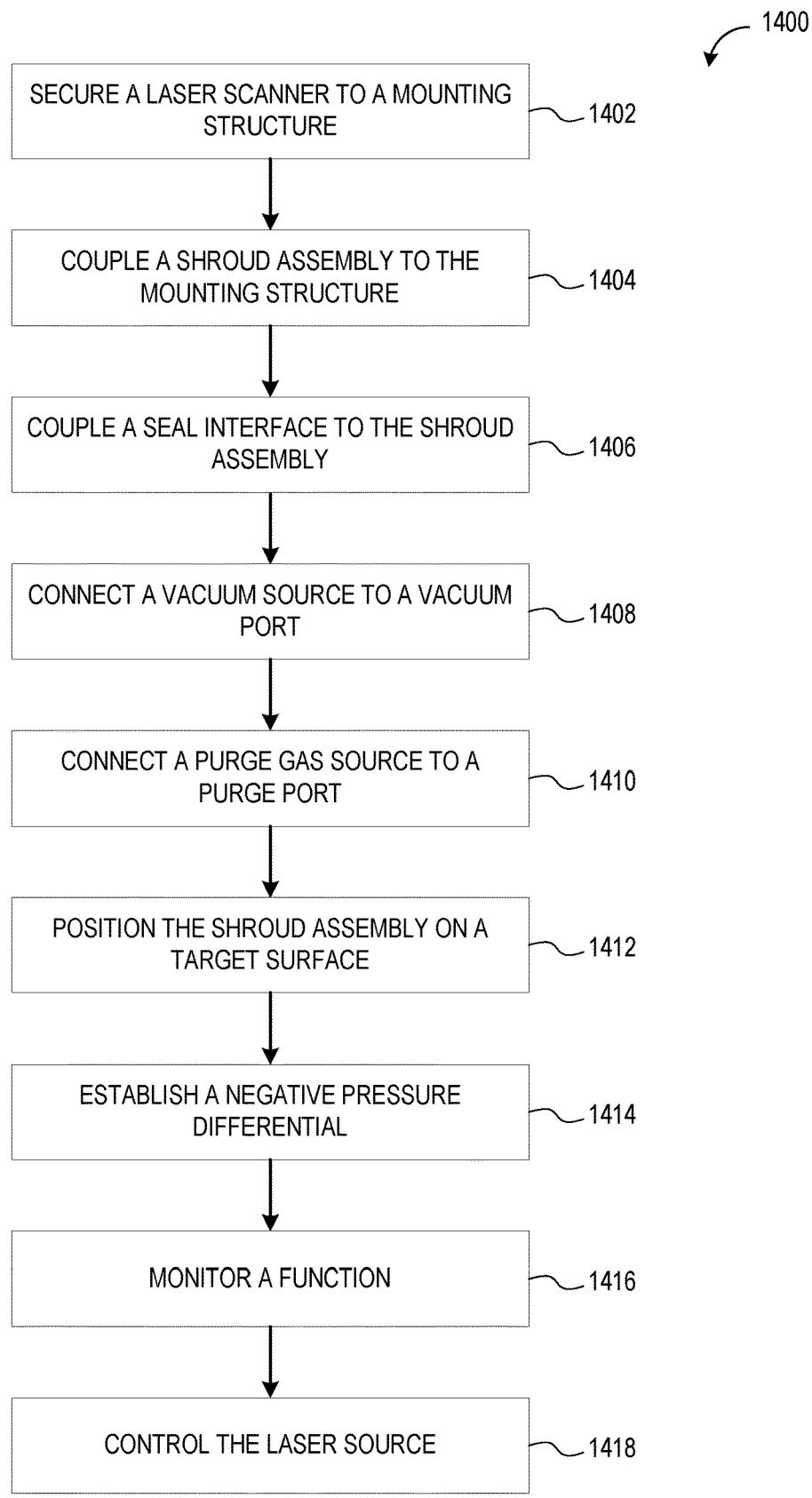
FIG. 14 is a flow diagram depicting an example method for containing a laser beam with the laser containment apparatus of FIG. 1.

FIG. 14 is a flow diagram depicting an example method 1400 for containing a laser beam. The following description of method 200 is provided with reference to the laser containment apparatus 100 described herein and shown in FIGS. 1-13. Method 1400 is used in at least one application selected from the group consisting of laser marking, laser engraving, laser tool cleaning, laser hole drilling, laser micro-perforation, laser removal of adhesive, laser removal of sealant, laser removal of coating, laser preparation for composite bonding, laser preparation for welding, remote laser welding, laser machining of composites, and laser-assisted metal additive repair. Additionally, it will be appreciated that method 1400 or portions thereof can be performed in other contexts using other suitable components.

With reference to FIG. 14, at step 1402, the method 1400 includes securing the laser scanner 110 to the mounting structure 114. As described in detail above, the laser scanner 110 includes the laser source 112.

At step 1404, the method 1400 includes coupling a shroud assembly 116 to the mounting structure 114. As described in detail above, the shroud assembly 116 is configured to surround a working volume V of the laser scanner 110.

At step 1406, the method 1400 includes coupling a seal interface 118 to the shroud assembly 116 at an opposite end of the shroud assembly 116 from the laser scanner 110. As described above, a distal end of the seal interface 118 is formed of a pliable material 150. In some implementations, an adapter 188 is arranged between the shroud assembly 116 and the seal interface 118. The adapter 188 is shaped to form a light-tight seal around a workpiece 130 when a target surface 128 of the workpiece 130 is positioned within the working volume V of the laser scanner 110, thereby permitting the laser containment apparatus 100 to be configured for use with differently shaped workpieces 130.

At step 1408, the method 1400 includes connecting a vacuum source 122 to a vacuum port 120 included in the shroud assembly 116. As described above, the vacuum source 122 creates a vacuum inside the shroud assembly 116 and removes effluent from the laser containment apparatus 100.

At step 1410, the method 1400 includes connecting a purge gas source 126 to a purge port 124 included in the shroud assembly 116. As described above, the purge port 124 is configured to guide purge gas G from the purge gas source 126 toward the laser scanner 110 to keep optics of the laser scanner 110 free from debris and to clear the scan field. The purge gas G flows from the purge gas source 126 through the working volume V of the shroud assembly 116 and is withdrawn from the shroud assembly 116 via a passage 160 connect to the vacuum port 120.

At step 1412, the method 1400 includes positioning the shroud assembly 116 on a target surface 128 of a workpiece 130. As described above, a visual alignment system included in the laser containment apparatus 100 may assist the user in ensuring that the shroud assembly 116, coupled to the seal interface 118, is accurately positioned on the target surface 128 of the workpiece 130. Additionally or alternatively, the seal interface 118 can be configured as a vacuum chuck 176 that can be secured to the workpiece 130 prior to coupling with the shroud assembly 116, thereby permitting the user to position the target surface 128 within the working volume V of the laser scanner 110. A stencil template 170 can be coupled to the seal interface 118 to further mask areas of the target surface 128 of the workpiece 130.

At step 1414, the method 1400 includes establishing a negative pressure differential between a vacuum pressure in the shroud assembly 116 and ambient atmospheric pressure during operation of the laser scanner 110 to seal the shroud assembly 116 to the target surface 128 of the workpiece 130.

In some implementations, at step 1416, the method 1400 includes monitoring a function of the laser scanner 110 or shroud assembly 116 via a sensor. For example, the method 1400 includes monitoring a value of the negative pressure differential between the vacuum pressure inside the shroud assembly 116 and ambient atmospheric pressure via a vacuum sensor 134, monitoring a value of light intensity or wavelength inside the shroud assembly 116 prior to operation of the laser scanner 110 via a photodiode sensor 136, monitoring a value of a transmission distance D of the laser beam V via a distance sensor 138, and/or monitoring a value of a gas pressure supplied by the purge gas source 126.

In some implementations, at step 1418, the method 1400 includes controlling the laser source 112 according to feedback from the sensor. For example, the method 1400 includes interrupting power to the laser source 112 when the monitored value of the negative pressure differential falls below a threshold operating value, disabling the laser source 112 when the monitored value of the light intensity or the wavelength exceeds a threshold operating value, interrupting power to the laser source 112 when the monitored value of the transmission distance D exceeds a threshold operating value, and/or interrupting power to the laser source 112 when the monitored value of a gas pressure supplied by the purge gas source 126 does not meet a threshold operating value.

Figure 15:
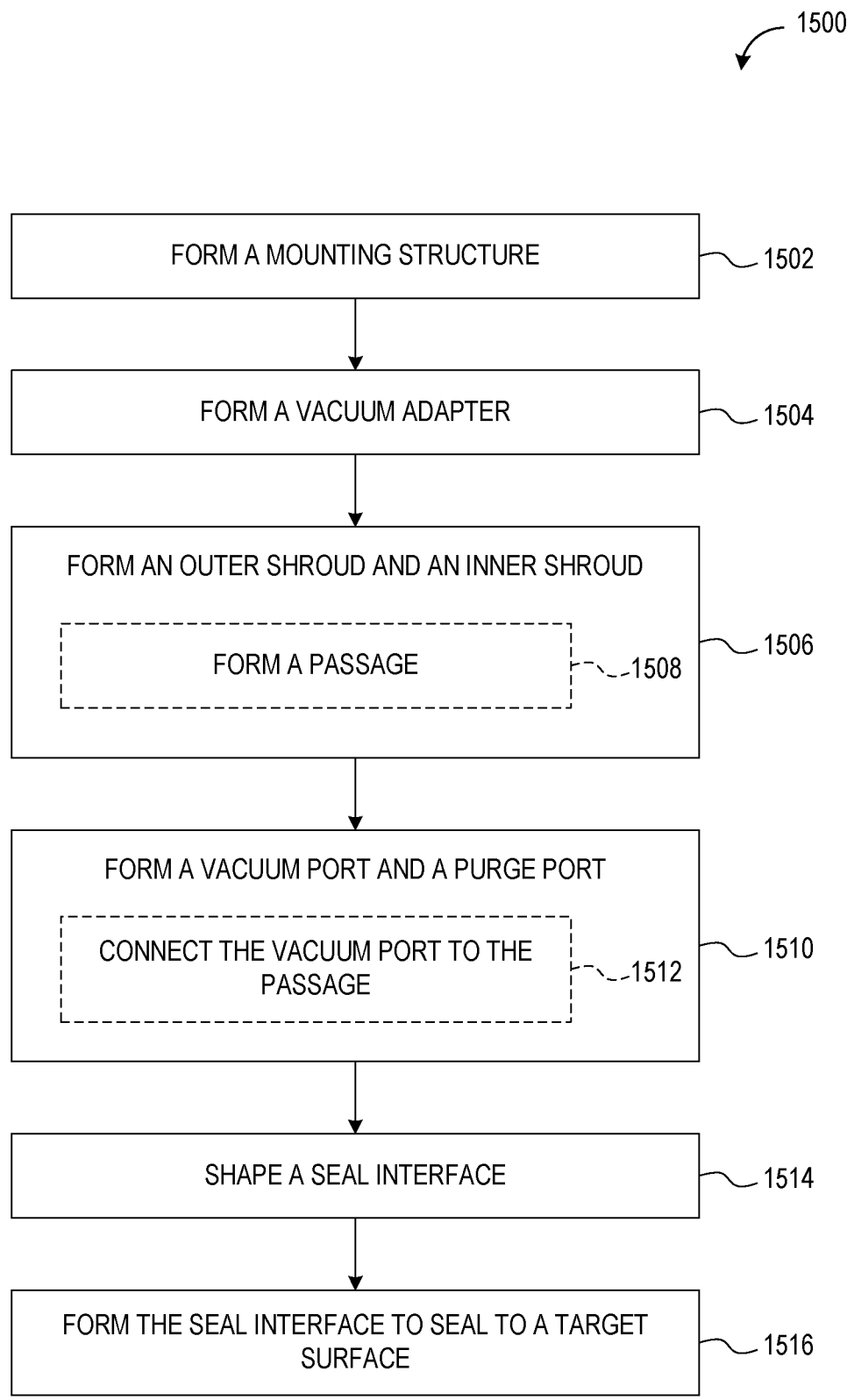
FIG. 15 is a flow diagram depicting an example method for manufacturing the laser containment apparatus of FIG. 1.

FIG. 15 is a flow diagram depicting an example method 1500 for manufacturing a laser containment apparatus 100. The following description of method 1500 is provided with reference to the laser containment apparatus 100 described herein and shown in FIGS. 1-13. However, it will be appreciated that method 1500 or portions thereof can be performed in other contexts using other suitable components.

With reference to FIG. 13, at step 1502, the method 1500 includes forming a mounting structure 114 to secure a laser scanner 110. At step 1504, the method 1500 includes forming a vacuum adapter 152 to couple with the mounting structure 114.

At step 1506, the method 1500 includes forming an outer shroud 154 and an inner shroud 156 to couple to the vacuum adapter 152 to create a shroud assembly 116 that surrounds a working volume V of the laser scanner 110.

At step 1508, the method 1500 includes shaping the outer shroud 154 and the inner shroud 156 such that a passage 160 is formed therebetween upon coupling to the vacuum adapter 152.

At step 1510, the method 1500 includes forming, in the vacuum adapter 152, a vacuum port 120 and a purge port 124. As described in detail above, the vacuum port 120 is configured to connect to a vacuum source 122 that creates a vacuum pressure inside the shroud assembly 116 and removes effluent from the laser containment apparatus 100. The purge port 124 is configured to guide purge gas G from a purge gas source 126 toward the laser scanner 110 to keep optics of the laser scanner 110 free from debris and to clear the scan field.

At step 1512, the method 1500 includes forming the vacuum port 120 to fluidically communicate with the passage 160. A circumferential gap 166 adjacent a distal end 168 of the inner shroud 156 permits the purge gas G to flow from the working volume V of the shroud assembly 116 into the passage 160 where it is withdrawn from the shroud assembly 116 via the vacuum port 120. In some embodiments, the passage 160 may be formed as a toroidal passage 160A.

At step 1514, the method 1500 includes shaping a seal interface 118 to couple with the shroud assembly 116 at an opposite end of the shroud assembly 116 from the laser scanner 110. As described above, the seal interface 118 can be coupled to the shroud assembly 116 via magnets, or with another mechanism such as a threaded interface or mechanical fastener. In some embodiments, the seal interface 116 is configured as a vacuum chuck 176 that is vacuum-sealed to a workpiece 130.

At step 1516, the method 1500 includes forming a distal end of the seal interface 118 of a pliable material 150 that is configured to compress and seal the shroud assembly 116 to a target surface 128 of a workpiece 130 upon establishment of a negative pressure differential between a vacuum pressure within the shroud assembly 116 and ambient atmospheric pressure. As described in detail above, the vacuum sensor 134 monitors a value of the negative pressure differential, and the controller 108 interrupts power to the laser source 112 when the monitored value of the light intensity or wavelength exceeds a threshold operating value. This halts operation of the laser scanner 110 under when the laser containment apparatus 100 is not securely sealed to the workpiece 130, thereby preventing exposure of the user to potentially harmful laser light, toxins, and/or gaseous effluent.

Further, the disclosure comprises configurations according to the following clauses:

Clause 1. A laser containment apparatus comprising: a mounting structure configured to secure a laser scanner, the laser scanner including a laser source; a shroud assembly coupled to the mounting structure and surrounding a working volume of the laser scanner, the shroud assembly including a vacuum port configured to connect to a vacuum source and a purge port configured to guide purge gas from a purge gas source toward the laser scanner; and a seal interface coupled to the shroud assembly at an opposite end of the shroud assembly from the laser scanner, a distal end of the seal interface being formed of a pliable material.

Clause 2. The laser containment apparatus of clause 1, wherein during operation of the laser scanner, the pliable material of the seal interface is configured to compress and seal the shroud assembly to a target surface of a workpiece upon establishment of a negative pressure differential between a vacuum pressure inside the shroud assembly and ambient atmospheric pressure.

Clause 3. The laser containment apparatus of clause 1 or 2, wherein the shroud assembly includes a vacuum adapter including the vacuum port and at least one sensor port.

Clause 4. The laser containment apparatus of any one of clauses 1-3, further comprising: a sensor port in fluidic communication with a vacuum sensor, the vacuum sensor being configured to monitor a value of a pressure differential between a vacuum pressure inside the shroud assembly and ambient atmospheric pressure, wherein the vacuum sensor is in communication with a controller, and the controller is configured to interrupt power to the laser source when the monitored value of the pressure differential falls below a threshold operating value.

Clause 5. The laser containment apparatus of any one of clauses 1-4, further comprising: a photodiode sensor in communication with a controller via a sensor port, the photodiode sensor being configured to monitor a value of light intensity or wavelength inside the shroud assembly prior to operation of the laser scanner, wherein the controller is configured to disable the laser source when the monitored value of the light intensity or the wavelength exceeds a threshold operating value.

Clause 6. The laser containment apparatus of any one of clauses 1-5, wherein the shroud assembly includes an outer shroud and an inner shroud with a passage formed therebetween, and the vacuum port fluidically communicates with the passage.

Clause 7. The laser containment apparatus of clause 6, wherein the passage is a toroidal passage, and a purge gas flowpath is defined within the shroud assembly, the purge gas flowpath configured to flow the purge gas: toward the laser scanner along a first flowpath segment; downward through the inner shroud toward the workpiece along a second flowpath segment; through a circumferential gap formed adjacent a distal end of the inner shroud along a third flowpath segment; and up the toroidal passage along a fourth flowpath segment.

Clause 8. The laser containment apparatus of any one of clauses 1-7, wherein the seal interface is configured as a vacuum chuck that is configured to be secured to a target surface of a workpiece prior to coupling with the shroud assembly.

Clause 9. The laser containment apparatus of any one of clauses 1-8, further comprising: an adapter arranged between the shroud assembly and the seal interface, wherein the adapter is configured to form a light-tight seal around a workpiece when a target surface of the workpiece is positioned within the working volume of the laser scanner.

Clause 10. The laser containment apparatus of any one of clauses 1-9, further comprising: a mounting adapter configured to mount the laser containment apparatus to a support structure.

Clause 11. The laser containment apparatus of any one of clauses 1-10, further comprising: a stencil template configured to mask a portion of a target surface of a workpiece, the stencil template being coupled to the seal interface via an indexed shelf.

Clause 12. A method for a containing a laser beam, the method comprising: securing a laser scanner to a mounting structure, the laser scanner including a laser source; coupling a shroud assembly to the mounting structure, the shroud assembly being configured to surround a working volume of the laser scanner; coupling a seal interface to the shroud assembly at an opposite end of the shroud assembly from the laser scanner; connecting a vacuum source to a vacuum port included in the shroud assembly; connecting a purge gas source to a purge port included in the shroud assembly; positioning the shroud assembly on a target surface of a workpiece; and establishing a negative pressure differential between a vacuum pressure inside the shroud assembly and ambient atmospheric pressure during operation of the laser scanner to seal the shroud assembly to the target surface of the workpiece.

Clause 13. The method of clause 12, the method further comprising: monitoring, via a vacuum sensor, a value of the negative pressure differential between the vacuum pressure inside the shroud assembly and ambient atmospheric pressure; and interrupting power to the laser source when the monitored value of the negative pressure differential falls below a threshold operating value.

Clause 14. The method of clause 12 or 13, the method further comprising: monitoring, via a photodiode sensor, a value of light intensity or wavelength inside the shroud assembly prior to operation of the laser scanner; and disabling the laser source when the monitored value of the light intensity or the wavelength exceeds a threshold operating value.

Clause 15. The method of any one of clauses 12-14, the method further comprising: monitoring, via a pressure sensor, a value of a gas pressure supplied by the purge gas source; and interrupting power to the laser source when the monitored value of the gas pressure does not meet a threshold operating value.

Clause 16. The method of any one of clauses 12-15, the method further comprising: arranging an adapter between the shroud assembly and the seal interface, wherein the adapter is configured to form a light-tight seal around a workpiece when a target surface of the workpiece is positioned within the working volume of the laser scanner.

Clause 17. The method of any one of clauses 12-16, the method further comprising: mounting the laser containment apparatus to a support structure via a mounting adapter.

Clause 18. The method of any one of clauses 12-17, wherein the method is used in at least one application selected from the group consisting of laser marking, laser engraving, laser tool cleaning, laser hole drilling, laser micro-perforation, laser removal of adhesive, laser removal of sealant, laser removal of coating, laser preparation for composite bonding, laser preparation for welding, remote laser welding, laser machining of composites, and laser-assisted metal additive repair.

Clause 19. A laser system comprising: a controller; a laser scanner including a laser source; and a laser containment apparatus including: a mounting structure configured to secure the laser scanner, a shroud assembly coupled to the mounting structure and surrounding a working volume of the laser scanner, and a seal interface coupled to the shroud assembly at an opposite end of the shroud assembly from the laser scanner, a distal end of the seal interface being formed of a pliable material, wherein the shroud assembly includes a vacuum port configured to connect to a vacuum source and a purge port configured to guide purge gas from a purge gas source toward the laser scanner, the pliable material of the seal interface is configured to compress and seal the shroud assembly to a target surface of a workpiece upon establishment of a negative pressure differential between a vacuum pressure inside the shroud assembly and ambient atmospheric pressure, and the controller is configured to control the laser source in accordance with feedback from one or more sensors.

Clause 20. The laser system of clause 19, further comprising: a mounting adapter, wherein the laser scanner and the laser containment apparatus are mounted on a robotic device via the mounting adapter, and the controller is further configured to control the robotic device in accordance with feedback from the one or more sensors.

It will be understood that the configurations and/or techniques described herein are exemplary in nature, and that these specific examples are not to be considered in a limiting sense, because numerous variations are possible. The specific methods and operations described herein may represent one or more of any number of processing strategies. As such, various acts illustrated and/or described may be performed in the sequence illustrated and/or described, in other sequences, in parallel, or omitted. Likewise, the order of the above-described operations may be changed, depending on implementation.

The subject matter of the present disclosure includes all novel and non-obvious combinations and sub-combinations of the various configurations and techniques, and other features, functions, acts, and/or properties disclosed herein, as well as any and all equivalents thereof.

The invention claimed is:

1. A laser containment apparatus comprising:
  a mounting structure configured to secure a laser scanner, the laser scanner including a laser source;
  a shroud assembly coupled to the mounting structure and surrounding a working volume of the laser scanner, the shroud assembly including a vacuum port configured to connect to a vacuum source and a purge port configured to guide purge gas from a purge gas source toward the laser scanner; and
  a seal interface coupled to the shroud assembly at an opposite end of the shroud assembly from the laser scanner, a distal end of the seal interface being formed of a pliable material, wherein
the shroud assembly includes an outer shroud and an inner shroud with a passage formed therebetween, and
a purge gas flowpath is defined within the shroud assembly in which purge gas is flowed downward through the inner shroud and into the passage between the inner shroud and the outer shroud via a circumferential gap formed adjacent a distal end of the inner shroud.

2. The laser containment apparatus of claim 1, wherein during operation of the laser scanner, the pliable material of the seal interface is configured to compress and seal the shroud assembly to a target surface of a workpiece upon establishment of a negative pressure differential between a vacuum pressure inside the shroud assembly and ambient atmospheric pressure.

3. The laser containment apparatus of claim 1, wherein the shroud assembly includes a vacuum adapter including the vacuum port and at least one sensor port.

4. The laser containment apparatus of claim 1, further comprising:
a sensor port in fluidic communication with a vacuum sensor, the vacuum sensor being configured to monitor a value of a pressure differential between a vacuum pressure inside the shroud assembly and ambient atmospheric pressure, wherein
the vacuum sensor is in communication with a controller, and
the controller is configured to interrupt power to the laser source when the monitored value of the pressure differential falls below a threshold operating value.

5. The laser containment apparatus of claim 1, further comprising:
a photodiode sensor in communication with a controller via a sensor port, the photodiode sensor being configured to monitor a value of light intensity or wavelength inside the shroud assembly prior to operation of the laser scanner, wherein
the controller is configured to disable the laser source when the monitored value of the light intensity or the wavelength exceeds a threshold operating value.

6. The laser containment apparatus of claim 1, wherein the vacuum port fluidically communicates with the passage.

7. The laser containment apparatus of claim 6, wherein the passage is a toroidal passage, and
the purge gas flowpath is configured to flow the purge gas:
toward the laser scanner along a first flowpath segment;
downward through the inner shroud toward a workpiece along a second flowpath segment;
through the circumferential gap formed adjacent the distal end of the inner shroud along a third flowpath segment; and
up the toroidal passage along a fourth flowpath segment.

8. The laser containment apparatus of claim 1, wherein the seal interface is configured as a vacuum chuck that is configured to be secured to a target surface of a workpiece prior to coupling with the shroud assembly.

9. The laser containment apparatus of claim 1, further comprising:
an adapter arranged between the shroud assembly and the seal interface, wherein
the adapter is configured to form a light-tight seal around a workpiece when a target surface of the workpiece is positioned within the working volume of the laser scanner.

10. The laser containment apparatus of claim 1, further comprising:
a mounting adapter configured to mount the laser containment apparatus to a support structure.

11. The laser containment apparatus of claim 1, further comprising:
a stencil template configured to mask a portion of a target surface of a workpiece, the stencil template being coupled to the seal interface via an indexed shelf.

12. A method for a containing a laser beam, the method comprising:
securing a laser scanner to a mounting structure, the laser scanner including a laser source;
coupling a shroud assembly to the mounting structure, the shroud assembly being configured to surround a working volume of the laser scanner, the shroud assembly including an outer shroud and an inner shroud with a passage formed therebetween;
coupling a seal interface to the shroud assembly at an opposite end of the shroud assembly from the laser scanner;
connecting a vacuum source to a vacuum port included in the shroud assembly;
connecting a purge gas source to a purge port included in the shroud assembly, the purge port being configured to direct purge gas from the purge gas source toward the laser scanner, downward through the inner shroud, and into the passage between the inner shroud and the outer shroud via a circumferential gap formed adjacent a distal end of the inner shroud;
positioning the shroud assembly on a target surface of a workpiece; and
establishing a negative pressure differential between a vacuum pressure inside the shroud assembly and ambient atmospheric pressure during operation of the laser scanner to seal the shroud assembly to the target surface of the workpiece.

13. The method of claim 12, the method further comprising:
monitoring, via a vacuum sensor, a value of the negative pressure differential between the vacuum pressure inside the shroud assembly and ambient atmospheric pressure; and
interrupting power to the laser source when the monitored value of the negative pressure differential falls below a threshold operating value.

14. The method of claim 12, the method further comprising:
monitoring, via a photodiode sensor, a value of light intensity or wavelength inside the shroud assembly prior to operation of the laser scanner; and
disabling the laser source when the monitored value of the light intensity or the wavelength exceeds a threshold operating value.

15. The method of claim 12, the method further comprising:
monitoring, via a pressure sensor, a value of a gas pressure supplied by the purge gas source; and
interrupting power to the laser source when the monitored value of the gas pressure does not meet a threshold operating value.

16. The method of claim 12, the method further comprising:
arranging an adapter between the shroud assembly and the seal interface, wherein the adapter is configured to form a light-tight seal around a workpiece when a target surface of the workpiece is positioned within the working volume of the laser scanner.

17. The method of claim 12, the method further comprising:
mounting the laser containment apparatus to a support structure via a mounting adapter.

18. The method of claim 12, wherein
the method is used in at least one application selected from the group consisting of laser marking, laser engraving, laser tool cleaning, laser hole drilling, laser micro-perforation, laser removal of adhesive, laser removal of sealant, laser removal of coating, laser preparation for composite bonding, laser preparation for welding, remote laser welding, laser machining of composites, and laser-assisted metal additive repair.

19. A laser system comprising:
a controller;
a laser scanner including a laser source; and
a laser containment apparatus including:
a mounting structure configured to secure the laser scanner,
a shroud assembly coupled to the mounting structure and surrounding a working volume of the laser scanner, and
a seal interface coupled to the shroud assembly at an opposite end of the shroud assembly from the laser scanner, a distal end of the seal interface being formed of a pliable material, wherein
the shroud assembly includes an outer shroud and an inner shroud with a passage formed therebetween,
the shroud assembly includes a vacuum port configured to connect to a vacuum source and a purge port configured to direct purge gas from a purge gas source toward the laser scanner, downward through the inner shroud, and into the passage between the inner shroud and the outer shroud via a circumferential gap formed adjacent a distal end of the inner shroud,
the pliable material of the seal interface is configured to compress and seal the shroud assembly to a target surface of a workpiece upon establishment of a negative pressure differential between a vacuum pressure inside the shroud assembly and ambient atmospheric pressure, and
the controller is configured to control the laser source in accordance with feedback from one or more sensors.

20. The laser system of claim 19, further comprising:
a mounting adapter, wherein
the laser scanner and the laser containment apparatus are mounted on a robotic device via the mounting adapter, and
the controller is further configured to control the robotic device in accordance with feedback from the one or more sensors.

\* \* \* \* \*